Dec. 30, 1947.　　　S. T. PETERSON　　　2,433,528
LATERAL MOTION DEVICE FOR LOCOMOTIVES
Filed April 24, 1945　　　2 Sheets-Sheet 1
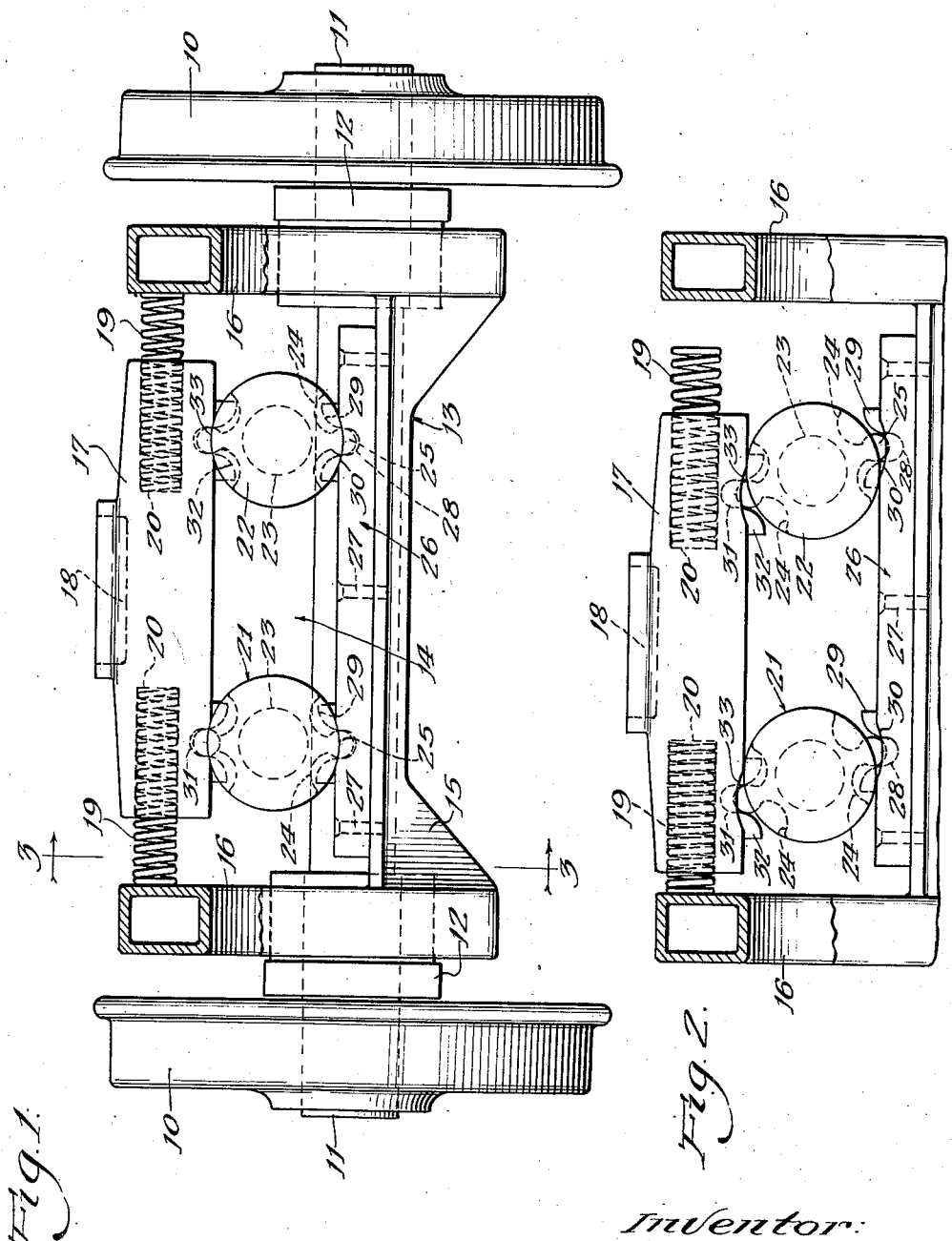
Inventor:
Samuel T. Peterson
By: Bertha L. MacGregor
Attorney Dec. 30, 1947.  S. T. PETERSON  2,433,528
LATERAL MOTION DEVICE FOR LOCOMOTIVES
Filed April 24, 1945      2 Sheets-Sheet 2
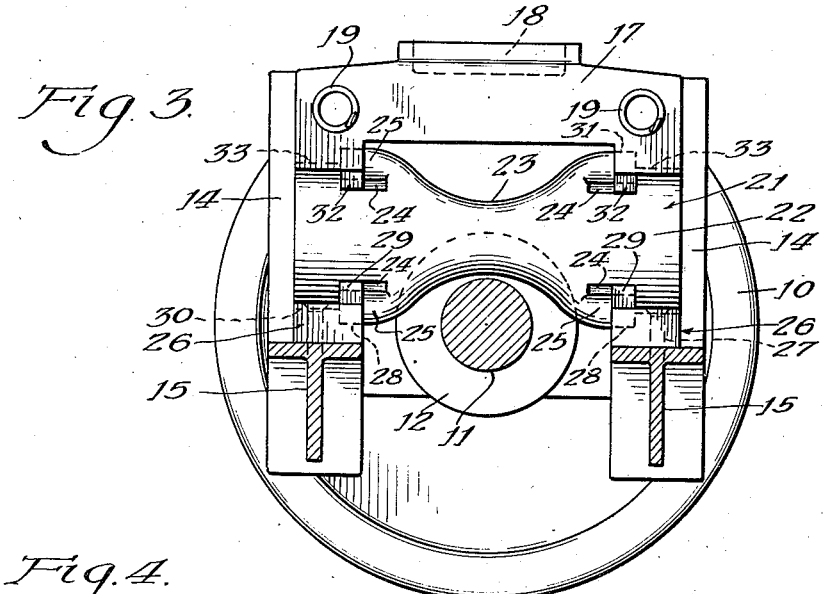
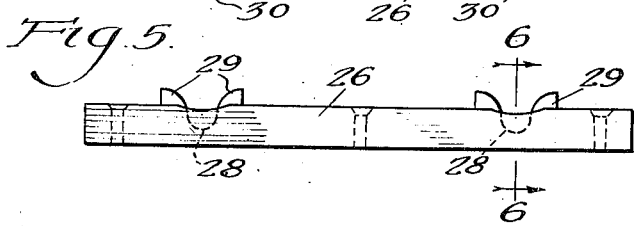
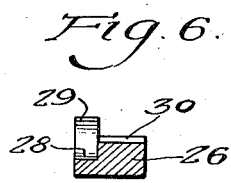
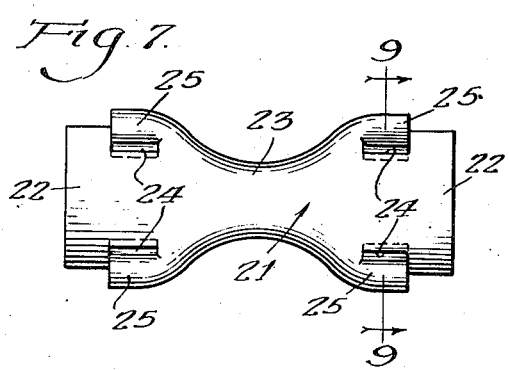
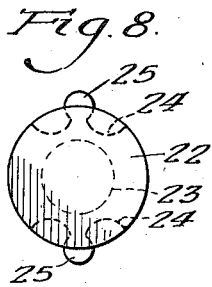
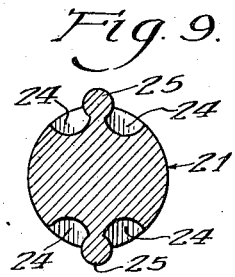
Inventor:
Samuel T. Peterson
By: Bertha Le. Macgregor
Attorney Patented Dec. 30, 1947

2,433,528

UNITED STATES PATENT OFFICE 2,433,528

LATERAL MOTION DEVICE FOR LOCOMOTIVES

Samuel T. Peterson, Chicago, Ill.

Application April 24, 1945, Serial No. 589,955

1 Claim. (Cl. 105—189)

This invention relates to improvements in railway locomotives, and particularly to improvements in lateral motion devices for locomotives.

The wheel base of a locomotive is too long to move around a curve without providing for relative movement between the locomotive body and the trucks, and between the truck and wheels when the wheels are not in alignment. Because of the association of the driving rods with the main driving wheels, said wheels necessarily must remain in nearly perfect alignment, and therefore it is important to provide flexibility and relative movement between the locomotive body and the trucks which are conventionally mounted on the wheel axles.

Usually two trucks are provided, one called the engine truck, located beneath the cylinders of the engine, and the other the trailer truck, located under the fire box or cab of the engine. My invention, preferably, is embodied in both trucks of the locomotive. The device is applicable to both four wheel trucks and two wheel trucks.

The main object of the invention is to provide lateral motion devices for locomotives which are simple in construction and efficient and dependable in operation; which will support the locomotive body properly when the trucks swing laterally; which will provide combined roller and rocker movement of the device between the truck and the engine-supporting casting when lateral movement of the truck or locomotive takes place, whereby controlled, positive movement of the roller-rocker device and its return to normal position are attained; and which are provided with shock-absorbing means to cushion the lateral thrust of the truck against the engine center casting.

An important feature of my invention is the design of the special roller and rocker member and of the seats provided therefor, whereby the controlled, positive combined roller and rocker action is attained.

The use of my invention reduces the friction against the journal boxes, reduces strain on the engine frame, and prolongs the life of the tires by eliminating the cause of much unnecessary friction against the rail flanges. The device of my invention is easily reconditioned, for the wear surfaces of my roller-rocker can be welded up and then turned in a lathe.

Other objects and advantages will be apparent from the following description.

In the drawings:

Fig. 1 is a front elevational view, partly in section, of a locomotive truck embodying my invention, showing the lateral motion device in normal position.

Fig. 2 is a view similar to Fig. 1, showing part of the truck, with the lateral motion device in a different position, namely, the position which the truck assumes when the wheels are out of alignment.

Fig. 3 is a vertical sectional view, taken longitudinally of the locomotive, in the plane indicated by the line 3—3 of Fig. 1.

Fig. 4 is a top plan view of the lower roller seat member, detached from the rest of the mechanism.

Fig. 5 is an elevational view of the lower seat.

Fig. 6 is a transverse, vertical sectional view taken in the plane of the line 6—6 of Fig. 5.

Fig. 7 is an elevational view of the roller-rocker member of the lateral motion device, detached.

Fig. 8 is an end elevation of the same.

Fig. 9 is a transverse, vertical sectional view taken in the plane of the line 9—9 of Fig. 7.

In that embodiment of the invention shown in the drawings, 10, 10 indicate the forward wheels of a locomotive, 11 the axle, and 12 the roller bearings for the truck which is indicated as a whole at 13. The truck 13 comprises transverse walls 14, 14, parallel with the axle 11, T-shaped bars 15, 15, for supporting the lateral motion device hereinafter described, and side walls 16, 16. The center casting 17 is recessed in its top as indicated at 18 for receiving and supporting part of the engine (not shown). Said casting 17 is also recessed at each side for the reception of coiled springs 19, 19, which at one end bear against the inner walls 20, 20 of the recesses and at their other ends bear against the inner surfaces of the truck walls 16, 16, as shown in Fig. 1, in normal position. In Fig. 2, the position of the center casting 17 relatively to the truck 13 has been changed to illustrate lateral motion, and in that position one of the springs 19 may be out of contact with the truck wall 16, whereas the other spring 19 is under increased compression between the recess end 20 and said opposite wall 16. The length of the springs 19 may vary; their length depends on the requirements of the particular truck and type. If the springs 19 are long enough to be compressed in normal position, they would not be out of contact with the truck wall 16 when under the influence of lateral motion.

In Figs. 7, 8 and 9, there is shown, detached, the roller-rocker member 21 which is an important feature of my invention. Preferably, two such devices 21 are used for each truck of the locomotive. The devices 21 extend longitudinally, that is, axially at right angles to the axle 11. The device 21 comprises cylindrical end portions 22, 22, and a central hour-glass form portion 23.

Between the center 23 and each end, said cylindrical members 22, 22 are cut away as shown at 24, 24 to provide concave recesses, and between said recesses are formed the radially protruding rocker members 25, 25. As shown, there are two rocker members 25, diametrically opposite each other, located inwardly of the solid cylindrical portions 22 at each end of the rocker-roller device 21.

Special seats are provided for the devices 21, shown detached in Figs. 4 and 5. The lower seat comprises a horizontally disposed bar 26 secured to the T-frame 15 of the truck by screws 27. The bar 26 is cut away on its upper surface, adjacent one longitudinal edge, to provide two concave surfaces 28, 28, complemental to and adapted to receive the rockers 25 of the two devices 21. These concave surfaces 28 are located between ears 29 arranged in pairs. The upper surfaces of the ears 29 are opposed to the cut away surfaces 24, 24 at each side of the rocker 25 when the latter is in position on the lower seat. Between the rocker seat and the opposite longitudinal edge of the bar 26, said bar is slightly concaved as indicated at 30 to provide a roller bearing seat for the cylindrical end portions 22 of the devices 21.

The upper seat for the roller-rocker members 21 may consist of a bar identical with the bar 26 but inverted in position and attached to the center casting 17, but preferably the upper seat is cast integrally with said casting as shown herein. Parts indicated at 31, 32 and 33 correspond with the rocker seat 28, ears 29 and roller seat 30, respectively, of the lower seat 26, excepting that the upper parts are inverted.

From the foregoing, it will be understood that when the parts are assembled in a truck of a locomotive, the roller ends 22 of each device 21 will have roller engagement with the surfaces 30 of the lower seat 26 and with the surfaces 33 of the upper seat formed in the casting 17, and the rockers 25, located inwardly from each cylindrical portion 22, will have rocking engagement with the concave seats 28 and 31. The concave surfaces 24, 24, adjacent the rockers 25, accommodate the ears 29, 29 formed on the lower seat and the ears 32, 32 formed on the upper seat, while said ears serve to insure the return to normal of the roller-rocker devices 21.

As heretofore explained, and as best shown in Figs. 3, 4 and 6, the roller bearing recess 30 in the lower seat 26 is quite shallow as compared with the arcuate recess 28 for receiving the rocker 25. The same is true of the corresponding roller bearing recess 33 and rocker bearing recess 31 of the upper seat. Due to this difference in the radii of the roller bearing recess and the rocker bearing recess, there is formed between said recesses a vertical wall against which the outer face of the rocker 25 bears when the parts are assembled as shown in Fig. 3, whereby end thrust exerted by said roller-rocker device 21 is also transmitted to said upper and lower seats and the parts to which they are rigidly connected.

While I prefer to employ the springs 19 for shock-absorbing purposes on both the engine and trailer trucks, in my invention, said springs may be dispensed with on the trailer truck if desired.

In the normal operation of the locomotive, while running on a straight track, the roller portions 22 of the lateral motion devices will be at rest in the shallow curved seats 30, 33, and although these seats are recessed only about one quarter of an inch, they offer the required resistance to the sidewise motion of the front end of the engine which is caused by the alternating impulses of the piston strokes. When lateral motion influences the center casting and locomotive, the rockers 25 leave their seats but do not move beyond the proximate surfaces of the pairs of ears 29, 29, and 32, 32. The construction permits tilting or rocker movement of the device as a whole, while it is supported for limited roller movement between the ends 22 and their slightly curved seats.

Changes may be made in details of construction and form of the parts without departing from the scope of my invention as set forth in the appended claim.

I claim:

A lateral motion device for multi-wheel locomotive trucks, comprising in combination with an axle equipped truck and a center casting on which the locomotive is mounted, opposed lower and upper parallel and horizontal seats on the truck and casting at each side of the axle with the plane of the lower seats intersecting the axle, a plurality of roller-rocker members disposed between the truck and casting for supporting the latter and permitting lateral motion thereof, each of said roller-rocker members comprising spaced cylindrical end portions having rolling engagement with the lower and upper seats and central portions of substantially less diameter than the cylindrical end portions for clearing the axle, and interengageable projections and recesses on the seats and cylindrical end portions for limiting rolling of the cylindrical end portions on said seats.

SAMUEL T. PETERSON.

REFERENCES CITED

The following references are of record in the file of this patent:

UNITED STATES PATENTS

| Number | Name | Date |
| --- | --- | --- |
| 66,914 | Tynan et al. | July 16, 1867 |
| 948,067 | Taylor | Feb. 1, 1910 |
| 1,689,261 | Todd | Oct. 30, 1928 |
| 2,051,648 | Oelkers et al. | Aug. 18, 1936 |
| 2,263,442 | Maris | Nov. 18, 1941 |